US012783039B2

(12) United States Patent
Han et al.

(10) Patent No.: US 12,783,039 B2
(45) Date of Patent: Nov. 3, 2026

(54) CLOUD SERVER DEVICE, BATTERY MANAGEMENT SYSTEM AND METHOD INCLUDING THE SAME

(71) Applicants: KYUNGPOOK NATIONAL UNIVERSITY INDUSTRY-ACADEMIC COOPERATION FOUNDATION, Daegu (KR); BETTER-WHY CO., LTD., Chilgok-gun (KR)

(72) Inventors: Se Kyung Han, Daegu (KR); Gyeong Gak Kim, Daegu (KR)

(73) Assignees: KYUNGPOOK NATIONAL UNIVERSITY INDUSTRY-ACADEMIC COOPERATION FOUNDATION, Daegu (KR); BETTER-WHY CO., LTD., Chilgok-gun (KR)

( * ) Notice: Subject to any disclaimer, the term of this patent is extended or adjusted under 35 U.S.C. 154(b) by 460 days.

(21) Appl. No.: 18/281,384

(22) PCT Filed: Oct. 7, 2021

(86) PCT No.: PCT/KR2021/013762
§ 371 (c)(1),
(2) Date: Apr. 1, 2024

(87) PCT Pub. No.: WO2022/191372
PCT Pub. Date: Sep. 15, 2022

(65) Prior Publication Data
US 2024/0329713 A1 Oct. 3, 2024

(30) Foreign Application Priority Data
Mar. 11, 2021 (KR) ........................ 10-2021-0031854
Sep. 24, 2021 (KR) ........................ 10-2021-0126187

(51) Int. Cl.
*G06F 1/32* (2019.01)
*G06F 1/3212* (2019.01)

(52) U.S. Cl.
CPC .................................. *G06F 1/3212* (2013.01)

(58) Field of Classification Search
CPC .......................................................... G06F 1/32
See application file for complete search history.

(56) References Cited

U.S. PATENT DOCUMENTS

2012/0330475 A1* 12/2012 Chen ..................... G06F 1/3212 700/292
2013/0110296 A1* 5/2013 Khoo ...................... B60L 53/64 700/286

(Continued)

FOREIGN PATENT DOCUMENTS

CN 103085678 A 5/2013
CN 109649215 A 4/2019

(Continued)

OTHER PUBLICATIONS

Gamma, Erich et al., "Design Patterns: Elements of Reusable Object-Oriented Software", China Machine Press, 2000.

(Continued)

*Primary Examiner* — Phil K Nguyen
(74) *Attorney, Agent, or Firm* — Bridgeway IP Law Group, PLLC; Sang Ho Lee; Hyun Woo Shin

(57) ABSTRACT

Provided is a battery management system including: a battery management device, disposed on a mobile vehicle, for measuring battery information from a battery; a cloud server device for collecting the battery information from the battery management device and storing the battery information, and for, based on determination condition and service command of pre-registered battery management service, if it is determined that there exists battery information matching the determination condition, controlling a resulting infor- (Continued)

1 mation to be created from the extracted information in accordance with the service command; and a terminal device for receiving and outputting the resulting information.

17 Claims, 5 Drawing Sheets

(56) References Cited

U.S. PATENT DOCUMENTS

| | | | | |
|---|---|---|---|---|
| 2014/0203775 | A1* | 7/2014 | Kim | B60L 53/65 320/109 |
| 2018/0188332 | A1* | 7/2018 | Newman | B60K 35/10 |
| 2020/0079397 | A1 | 3/2020 | Harichandan et al. | |

FOREIGN PATENT DOCUMENTS

| | | | | |
|---|---|---|---|---|
| CN | 110324383 | A | 10/2019 | |
| CN | 110324394 | A | 10/2019 | |
| CN | 110549902 | A | 12/2019 | |
| CN | 110749827 | A | 2/2020 | |
| CN | 111262896 | A | 6/2020 | |
| CN | 111913985 | A | 11/2020 | |
| CN | 111942222 | A | 11/2020 | |
| JP | 2012-103095 | A | 5/2012 | |
| KR | 10-1755504 | B1 | 7/2017 | |
| KR | 10-2018-0044574 | A | 5/2018 | |
| KR | 10-2019-0009056 | A | 1/2019 | |
| KR | 10-1934858 | B1 | 1/2019 | |
| KR | 10-2020-0029939 | A | 3/2020 | |
| WO | WO-2018207213 | A1 * | 11/2018 | G07C 5/0841 |

OTHER PUBLICATIONS

China National Intellectual Property Administration, "Notification of First Office Action" for counterpart Chinese patent application No. 202180097982.9, issued on Jun. 11, 2026.

* cited by examiner

CLOUD SERVER DEVICE, BATTERY MANAGEMENT SYSTEM AND METHOD INCLUDING THE SAME

TECHNICAL FIELD

The present invention relates to a cloud server device, a battery management system including the cloud server device and a method of managing the battery. More specifically, the present invention relates to a cloud server device capable of estimating the state of a battery, a battery management system including the cloud server device and a method of managing the battery.

BACKGROUND ART

Batteries deployed in conventional electric vehicle, etc. are operated entirely by a battery management system (BMS). This BMS uses a technique of estimating the state of battery based on voltage, current and temperature data collected from a vehicle equipped with the BMS and an algorithm preloaded thereon.

In this regard, conventional BMSs have relied only on data collected from vehicles equipped with the BMS. Therefore, there are disadvantages that if the state estimation model which has been perfectly set with the complete pre-understanding of characteristic information of the battery deployed in the corresponding vehicle is not installed on the corresponding BMS, it is almost impossible for the BMS to high-dimensionally estimate the state of the battery, and that in particular, it is difficult to ameliorate the conditions such as the lifespan of battery or occurrence of abnormal phenomenon in the battery with only information collected from individual vehicles.

Further, due to hardware limitations of the embedded board mounted on the conventional BMSs, it is difficult to collect data over a long period of time and apply statistical methodology even for individual vehicle information.

For this reason, most BMSs are equipped with a SOC estimation algorithm based on simple current integration and open-circuit voltage table or with an algorithm of the state of power (SoP) level. Also, with regard to battery aging, the reality is that simple-level implementations such as simple current integration or DCIR derivation are performed.

DISCLOSURE

Technical Problem

The technical problem to be solved by the present invention is to provide a cloud server device that collects battery information and registers a battery management service so as to determine the state of the battery, to thereby estimate the state of the battery from the battery information, a battery management system including the cloud service device and a method of managing the battery.

Technical Solution

According to an aspect of the present invention, a battery management system comprises a battery management device for measuring battery information from a battery; a cloud server device for collecting and storing the battery information, and for, based on a determination condition of a pre-registered battery management service and a service command, when it is determined that there exists battery information matching the determination condition, controlling a resulting information to be created from the extracted information in accordance with the service command; and a terminal device for receiving and outputting the resulting information.

According to other aspect of the present invention, a battery management system comprises a collection unit for collecting battery information from a pre-prepared battery management device; a storage unit for storing the battery information; a control unit for, based on a determination condition of a pre-registered battery management service and service command, when it is determined that there exists battery information matching the determination condition, controlling for a resulting information to be created from the extracted information in accordance with the service command; and an output unit for outputting the resulting information.

Also, the control unit includes a framework module for extracting a determination condition from the battery management service and the service command; a detector module for determining whether battery information that meets the determination condition exists among the battery information stored in the storage unit; and a service module for, upon receipt of the battery information meeting the determination condition, executing the service command and creating a resulting information from the battery information.

Also, if it is determined that the battery information meets the determination condition, the detector module may request the framework module to extract the battery information matching the determination condition.

Also, if it is determined by the detector module that there exists the battery information matching the determination condition, the framework module may control for the service command to be executed by extracting the battery information matching the determination condition and transmitting the extracted battery information to the service module.

Also, if the resulting information is created in the service module, the framework module may control for the resulting information to be transmitted to the battery management device.

Also, if the battery management service is provided to estimate the charging state as resulting information, the detector module may determine whether the battery information of at least one of SAC, CAC, and FAC exists in the storage within a preset time interval based on the current time.

According to another aspect of the present invention, a method of managing a battery in a battery management system may comprises the steps of: measuring, by a battery management device, battery information from a battery; collecting, by a cloud server device, a battery information from a pre-prepared battery management device; storing the battery information in a cloud server device; controlling, by the cloud server device, for a resulting information to be created from the extracted battery information accordance with the service command if it is determined that based on the determination condition and service command of the pre-registered battery management service, there exists a battery information matching the determination condition; and receiving and outputting, by the terminal device, the resulting information.

Also, the cloud server device may include a framework module for extracting the determination condition and the service command from the battery management service; a detector module for determining whether there exists a battery information that meets the determination condition among the stored battery information; and a service module for executing the service command and creating the resulting information from the battery information upon receipt of the battery information meeting the determination condition.

Also, if it is determined that the battery information meets the determination condition, the detector module may request the framework module to extract the battery information matching the determination condition.

Also, if it is determined, by the detector module, that there exists the battery information matching the determination condition, the framework module may control for the service command to be executed by extracting the battery information matching the determination condition and transmitting the extracted battery information to the service module.

Also, if the resulting information is created in the service module, the framework module may control for the resulting information to be transmitted to the battery management device.

Also, if the battery management service is prepared to estimate a charging state as the resulting information, the detector module may determine whether a battery information of at least one of SAC, CAC, and FAC exists in the storage unit within a preset time interval based on the current time.

Effect of the Invention

According to one aspect of the present invention described above, by providing a cloud server device and a battery management system and method including the cloud server device, battery information is collected, a battery management service is registered to determine the state of the battery, and thus the state of the battery may be estimated from the battery information.

Figure 1:
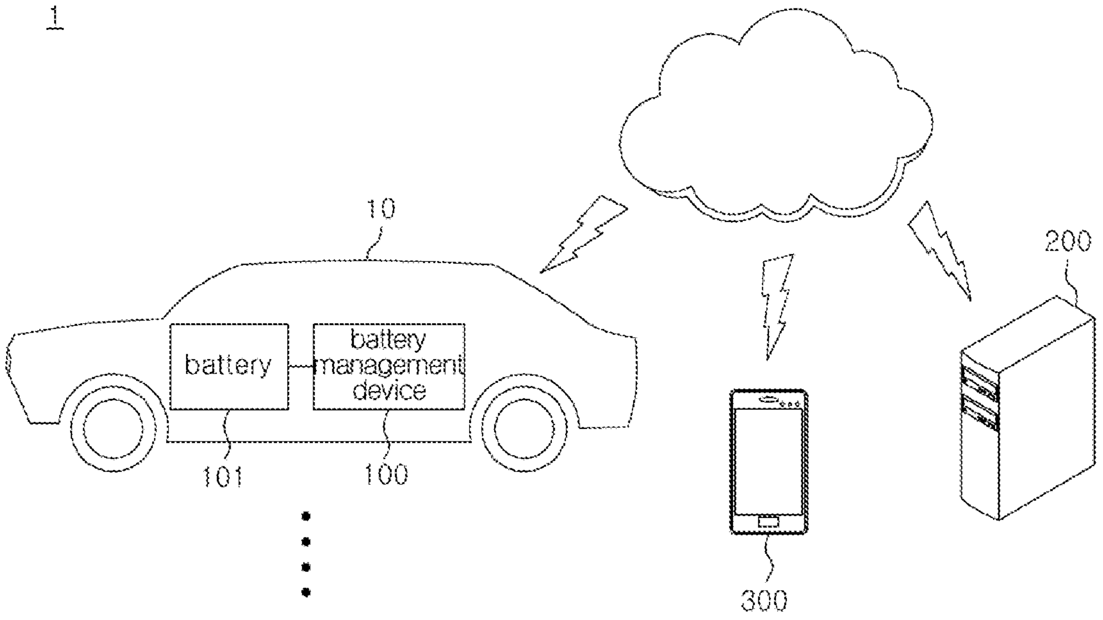
FIG. 1 is a schematic diagram of a battery management system according to an embodiment of the present invention.

The detailed description of the present invention described below refers to the accompanying drawings showing, by way of example, specific embodiments which may be practiced by the present invention. These embodiments are described in sufficient detail to enable those skilled in the art to practice the invention. It should be understood that the various embodiments of the present invention are different from one another but are not necessarily mutually exclusive. For example, specific shapes, structures and characteristics described herein in connection with one embodiment may be implemented in other embodiments without departing from the spirit and scope of the invention. Also, it should be understood that the location or arrangement of individual components within each disclosed embodiment may be changed without departing from the spirit and scope of the invention. Accordingly, the detailed description to be described hereinafter is not intended to be taken in a limiting sense, and the scope of the invention is limited only by the appended claims, together with all scopes equivalent to what those claims assert, if properly described. Similar reference numbers in the drawings refer to identical or similar functions across several aspects.

Hereinafter, preferred embodiments of the present invention will be described in more detail with reference to the drawings.

FIG. 1 is a schematic diagram of a battery management system according to an embodiment of the present invention.

The battery management system 1 may be configured to manage the battery 101 by estimating the state of the battery 101. Here, the battery management system 1 may be configured to perform management of the battery 101 through a battery as a service (BaaS).

To this end, the battery management system 1 may comprise a battery management device 100, a cloud server device 200 and a terminal device 300.

The battery management device 100 may be disposed on the mobile vehicle 10 and measure battery information. Accordingly, the battery management device 100 may be configured to control the battery 101 based on the battery information.

As such, the battery management device 100 may be a battery management system (BMS) provided in a mobile vehicle 10, etc. that requires a high-capacity battery, such as an electric bicycle, electric car, or hybrid car.

In this regard, the BMS may be configured to measure the voltage, current, and temperature of one or more cells provided in the battery 101 and control the operation of the battery 101 based on the measurement.

Accordingly, the battery management device 100 may create battery information by measuring the voltage, current, and temperature of the battery 101. At this time, measuring the battery information by the battery management device 100 may be creating the battery information by measuring the voltage, current, and temperature of one or more cells in the battery 101.

Meanwhile, the battery management device 100 may transmit battery information to the terminal device 300 or the cloud server device 200 through a wireless network, etc., and the terminal device 300 or the cloud server device 200 may receive the battery information from the battery management 100 device through a wireless network, etc.

The cloud server device 200 may collect and store battery information from the battery management device 100. Accordingly, based on a determination condition and service command of a pre-registered battery management service, if it is determined that there exists battery information matching the determination condition, the cloud server device 200 may control for a resulting information to be created from the extracted information in accordance with the service command.

At this time, the cloud server device 200 may collect battery information from each battery management device 100 disposed on different mobile vehicles 10, and accordingly, the battery information measured from different batteries 101 may be stored in the cloud server device 200.

Also, the battery management service may be understood as an algorithm configured to estimate the state of the battery 101 based on the battery information, and the resulting information may indicate the state of the battery 101 which is estimated based on the battery management service.

For example, the resulting information may be created to indicate information such as the state of charge (SoC) of the battery 101, the state of health (SoH) of the battery 101, and the state of power (SoP) of the battery 101, an abnormality in the battery 101 and the balance between cells of the battery 101.

Accordingly, the determination condition may mean the battery information required for the algorithm to be executed, and the service command may mean a machine language or command code configured to create the resulting information from battery information based on the algorithm.

For example, in case that the battery management service is configured to estimate the state of charge of the battery 101, if the amount of accumulated currents of the battery 101 exceeds a preset threshold value based on the time when the state of charging was previously estimated the determination condition may be set to estimate the charging state of the battery 101, and in this case, the service command may be configured to estimate the state of charging of the battery 101 based on information such as the amount of currents accumulated during a previously preset time interval based on the current time point, the maximum capacity of the battery 101, etc.

Also, the service command may mean a learning model configured using artificial intelligence (AI) techniques such as machine learning and reinforcement learning.

Here, the machine learning may be understood as a technique for creating a learning model so as to classify a plurality of information into one or more groups based on the plurality of information and classifying any information based on the created learning model. As such, the machine learning may include a supervised learning for creating a learning model so that any information may be classified in accordance with a plurality of information classified by an administrator, an unsupervised learning for creating a learning model by analyzing a plurality of information itself or performing a clustering process, a semi-supervised learning for creating a learning model by mixing supervised learning and unsupervised learning, a reinforcement learning for creating a learning model in accordance with a compensation created in the process of performing any actions for a plurality of information, etc.

Meanwhile, the cloud server device 200 may register a battery management service through a pre-configured cloud platform.

At this time, a user who wants to register a battery management service may access the cloud platform using a terminal device such as computer, smartphone and tablet and accordingly, the user who want to register a battery management service may upload the battery management service on the cloud platform and register it.

Through this, the cloud server device 200 may be registered with the battery management service through the cloud platform.

In this regard, the battery management service may be what prepared to estimate the state of charge in accordance with the accumulated current amount of the battery 101, and the battery management service may be what prepared to estimate the health state in accordance with the current and voltage of the battery 101. The battery management service may be what prepared to estimate the output state in accordance with the current and voltage of the battery 101, and the battery management service may be what prepared to determine whether there is an abnormality of the battery 101 in accordance with the current and voltage of the battery 101, and the battery management service may be what prepared to estimate the state of balance between the cells of the battery 101 in accordance with the current and voltage of the battery 101 and the voltage of the cells of the battery 101.

Also, the battery management service may be provided to estimate the state of the battery 101 based on the operation mode of the battery 101 and battery information.

The cloud server device 200 according to an embodiment of the present invention will be described in detail below.

Meanwhile, the terminal device 300 may receive resulting information from the cloud server device 200 and output it. Also, the terminal device 300 may receive battery information from the battery management device 100 and output it.

To this end, the terminal device 300 may be connected to the cloud server device 200 or the battery management device 100 through a wireless network, etc.

As such, the terminal device 300 may mean terminal devices such as a smartphone, tablet, and personal computer and accordingly, the terminal device 300 may receive a control command for the battery management device 100 from the user.

Figure 2:
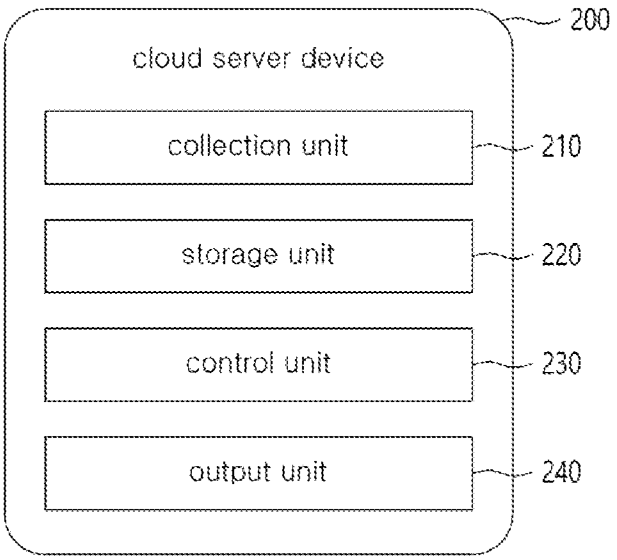
FIG. 2 is a control block diagram of a cloud server device according to an embodiment of the present invention.

FIG. 2 is a control block diagram of a cloud server device according to an embodiment of the present invention.

The cloud server device 200 may include a collection unit 210, a storage unit 220, a control unit 230 and an output unit 240.

Also, the cloud server device 200 may be implemented with more or less components than those shown in FIG. 2. Alternatively, the cloud server device 200 may integrate at least two components provided in the cloud server device 200 into one component, so that one component may perform a complex function. Hereinafter, the above-described components will be described in detail.

The collection unit 210 may collect battery information from the pre-configured battery management device 100.

Here, the battery information may include information such as a Capacity Retention (CR) of the battery 101, a current flowing in the battery 101, a voltage of the battery 101, and a voltage of the cells of the battery 101.

The storage unit 220 may store battery information, in this case, the storage unit 220 may store the battery information based on a preset time interval.

Accordingly, the control unit 230 may calculate the accumulated current amount of the battery 101 in accordance with the battery information collected during a preset time interval.

For example, the control unit 230 may calculate a System Accumulated Current (SAC) by accumulating the current of the battery 101 collected from a preset reference time, and SAC may mean the accumulated amount of current.

At this time, the sign of the current collected in accordance with the charging or discharging operations of the battery 101 may change, which may mean that the direction of the current changes.

Accordingly, the control unit 230 may set the accumulated amount of current at the point where the battery 101 enters a fully charged state as a Ceiling Accumulated Current (CAC), and the CAC may mean the value of SAC at the ceiling point. At this time, CAC may mean a point where the size of SAC changes to a state that decreases from a maximally increased state.

Also, the control unit 230 may set the accumulated amount of the current at the point where the battery 101 has entered a fully discharged state as a Floor Accumulated Current (FAC), and the FAC may mean the value of SAC at the floor point. At this time, FAC may mean the value of SAC at the point where the size of SAC changes to a state that increases from a maximally decreased state.

Meanwhile, the control unit 230 may calculate a System Accumulated Absolute Current (SAAC) by accumulating the absolute current values of the battery 101 collected from a preset reference time, and the SAAC may mean the accumulated amount of the absolute current values.

At this time, the control unit 230 may set the accumulated amount of the absolute current value at the point where the battery 101 enters a fully charged state as a Ceiling Accumulated Absolute Current (CAAC), and the CAAC may mean the value of SAAC at the ceiling point. At this time, CAAC may mean the value of SAAC at the point where the size of SAAC changes to a state that decreases from a maximally increased state.

Also, the control unit 230 may set the accumulated amount of the absolute current values at the point where the battery 101 has entered a fully discharged state as a Floor Accumulated Absolute Current (FAAC), and the FAAC may mean the value of SAAC at the floor point. At this time, FAAC may mean the value of SAAC at the point where the size of SAC changes to a state that increases from a maximally decreased state Also, the storage unit 220 may store information such as SAC, CAC, FAC, SAAC, CAAC, FAAC, and CR as battery information.

If it is determined that based on the determination condition and service command of a pre-registered battery management service, there exists battery information matching the determination condition, the control unit 230 may control for the resulting information to be created from the battery information extracted in accordance with the service command.

To this end, the control unit 230 may include a framework module 231, a detector module 233 and a service module 235.

The framework module 231 may extract the decision condition and service command from the battery management service.

Accordingly, the detector module 233 may determine whether battery information that meets the determination condition exists among the battery information stored in the storage unit 220.

For example, if the battery management service is configured to estimate the charging state, the detector module 233 may determine whether battery information such as SAC, CAC, FAC, SAAC, CAAC, FAAC and CR in the storage unit within a preset time interval based on the current time.

At this time, when the battery management service is prepared to estimate the charging state as resulting information, the detector module 233 may determine whether at least one of SAC, CAC, and FAC battery information exist in the storage unit within a preset time interval based on the current time.

Accordingly, if it is determined that the battery information meets the decision condition, the detector module 233 may request the framework module 231 to extract battery information that matches the decision condition.

In one embodiment, when it is determined that only SAC and CR among the battery information exist in the storage unit 220, the detector module 233 requests the framework module 231 to extract SAC, CR, and a preset current accumulation amount.

Here, the preset current accumulation amount may be set to match at least one of SAC and CR information.

At this time, the preset current accumulation amount may be set based on experimental values, etc. for the battery 101.

In other embodiment, when it is determined that only CAC, SAC, and CR among the battery information exist in the storage unit 220, the detector module 233 requests the framework module 231 to extract CAC, SAC and CR.

In another embodiment, when it is determined that only FAC, SAC, and CR among the battery information exist in the storage unit 220, the detector module 233 requests the framework module 231 to extract FAC, SAC and CR.

In other embodiment, when it is determined that SAAC, CAAC, FAAC, FAC, CAC, SAC and CR among the battery information exist in the storage unit 220, the detector module 233 may request the framework module 231 to extract SAAC, CAAC, FAAC, FAC, CAC, SAC and CR.

In this way, the detector module 233 may request the necessary battery information based on the decision condition of the battery management service.

In this case, if it is determined by the detector module 233 that there exists battery information meeting the determination condition, the framework module 231 may extract battery information matching the determination conditions, and the framework module 231 may transmit the extracted battery information to the service module 235 and control for the service command to be executed.

At this time, the determination by the detector module 233 that there exists battery information matching the decision condition means that the extraction of battery information matching the decision condition has been requested from the detector module 233.

Upon receipt of the battery information that meets the determination conditions from the framework module 231, the service module 235 may execute a service command and create resulting information from the battery information.

In one embodiment, when receiving SAC, CR and a preset current accumulation amount from the framework module 231, the service module 235 may estimate the charging state in accordance with the ratio of the sum of SA for CR and the preset current accumulation amount as shown in Equation 1 below.

Here, it may be understood that the estimated charging state is the resulting information.

$$SOC = \frac{SAC + AC_{set}}{CR} * 100 \quad \text{[Equation 1]}$$

Here, SOC refers to the charging state, and AC_set refers to a preset current accumulation amount.

In other embodiment, when receiving CAC, SAC and CR from the framework module 231, the service module 235 may estimate the charging state in accordance with the ratio of the difference between CAC and SAC to CR, as shown in Equation 2 below.

$$SOC = \left(1 - \frac{CAC - SAC}{CR}\right) * 100 \quad \text{[Equation 2]}$$

In another embodiment, when receiving FAC, SAC and CR from the framework module 231, the service module 235 may estimate the charging state in accordance with the ratio of the difference between SAC and FAC to CR, as shown in Equation 3 below.

$$SOC = \frac{SAC - FAC}{CR} * 100 \quad \text{[Equation 3]}$$

In other embodiment, when receiving SAAC, CAAC, FAAC, FAC, CAC, SAC and CR from the framework module 231, the service module 235 may estimate the charging state by comparing the difference between SAAC and CAAC and the difference between SAAC and FAAC.

At this time, if the difference between SAAC and CAAC is greater than the difference between SAAC and FAAC, the service module 235 may estimate the charging state in accordance with the ratio of the difference between SAC and FAC to CR, as shown in Equation 3 above. Here, the fact that the difference between SAAC and CAAC is greater than the difference between SAAC and FAAC may be understood as the fact that the battery pack was most recently fully discharged rather than fully charged.

Also, if the difference between SAAC and CAAC is smaller than the difference between SAAC and FAAC, the service module 235 may estimate the charging state in accordance with the ratio of the difference between CAC and SAC to CR, as shown in Equation 2 above. Here, the fact that the difference between SAAC and CAAC is smaller than the difference between SAAC and FAAC may be understood as the fact that the battery pack was most recently fully charged rather than fully discharged.

In this way, the service module 235 may create resulting information from battery information based on the service command of the battery management service.

In this case, if the resulting information is created in the service module 235, the framework module 231 may control for the resulting information to be transmitted to the battery management device 100 or the terminal device 300.

Through this, the battery management device 100 may update or control the state of the battery 101 based on the resulting information.

The output unit 240 may output the resulting information. At this time, the output unit 240 may be configured to output resulting information in the form of preset shape, number, letter, picture, etc. through a display device, etc.

Meanwhile, the output unit 240 may be configured to transmit the resulting information to the battery management device 100 or the terminal device 300 under the control of the control unit 230.

In this case, the output unit 240 may transmit the resulting information to the battery management device 100 or the terminal device 300 through a wireless network or the like.

Figure 3:
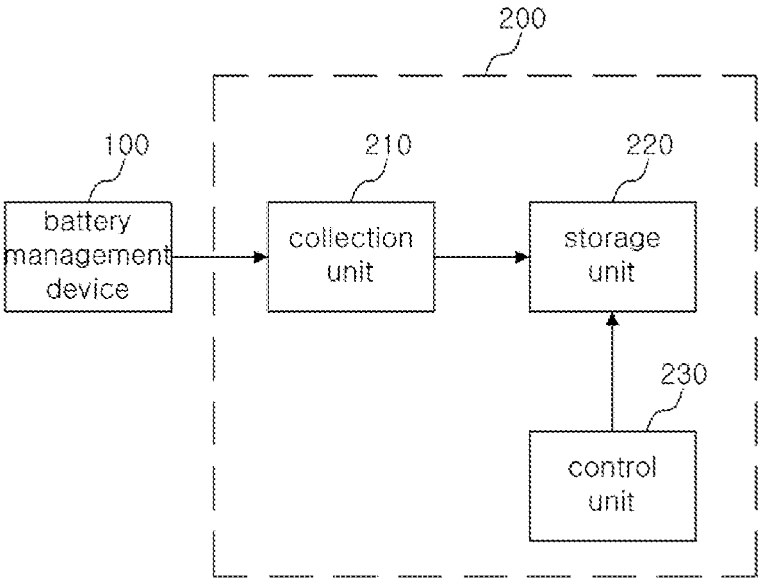
FIG. 3 is a block diagram showing the process of storing battery information in the storage unit of FIG. 2.

FIG. 3 is a block diagram showing the process of storing battery information in the storage unit of FIG. 2.

Referring to FIG. 3, the battery management device 100 may measure battery information from the battery 101.

Accordingly, the collection unit 210 may collect battery information from the pre-prepared battery management device 100.

The storage unit 220 may store battery information. At this time, the storage unit 220 may store the battery information based on a preset time interval.

At this time, the control unit 230 may calculate the accumulated current amount of the battery 101 in accordance with battery information collected during a preset time interval. Accordingly, the storage unit 220 may store information such as SAC, CAC, FAC, SAAC, CAAC, FAAC, and CR as battery information.

Figure 4:
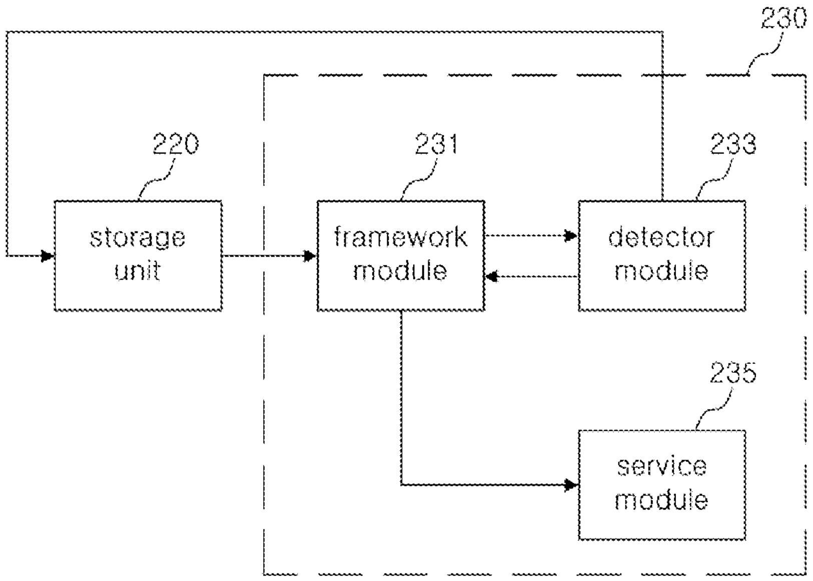
FIG. 4 is a detailed block diagram showing the process of creating resulting information by the control unit of FIG. 2.

FIG. 4 is a detailed block diagram showing the process of creating the resulting information by the control unit of FIG. 2.

Referring to FIG. 4, the storage unit 220 may store battery information. At this time, the storage unit 220 may store the battery information based on a preset time interval.

Meanwhile, the framework module 231 may extract the decision condition and service command from the battery management service.

Accordingly, the detector module 233 may determine whether the battery information that meets the determination condition exists among the battery information stored in the storage unit 220, and if it is determined that the battery information meets the determination condition, the detector module 233 requests the framework module 231 to extract the battery information that matches the determination conditions.

In this case, if it is determined by the detector module 233 that there exists the battery information matching the determination condition, the framework module 231 may extract the battery information matching the determination condition, and the framework module 231 may transmit the extracted battery information to the service module 235 and control for the service command to be executed.

Accordingly, upon the receipt of the battery information meeting the determination condition from the framework module 231, the service module 235 may execute a service command and create the resulting information from the battery information.

In this case, if the resulting information is created in the framework module 231, the framework module 231 may control for the resulting information to be transmitted to the battery management device 100 or the terminal device 300.

Figure 5:
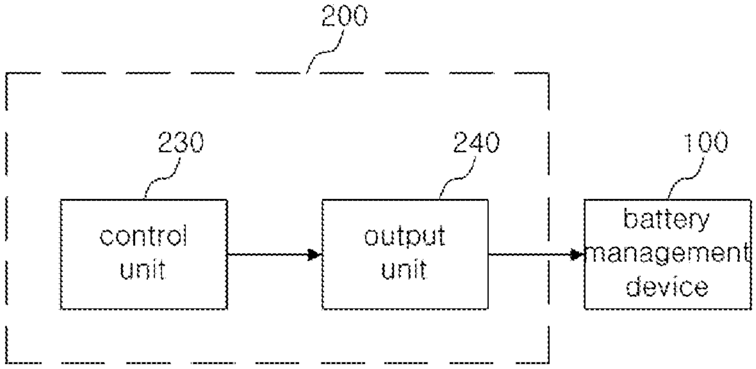
FIG. 5 is a block diagram showing the process of outputting the resulting information by the output unit of FIG. 2.
Figure 6:
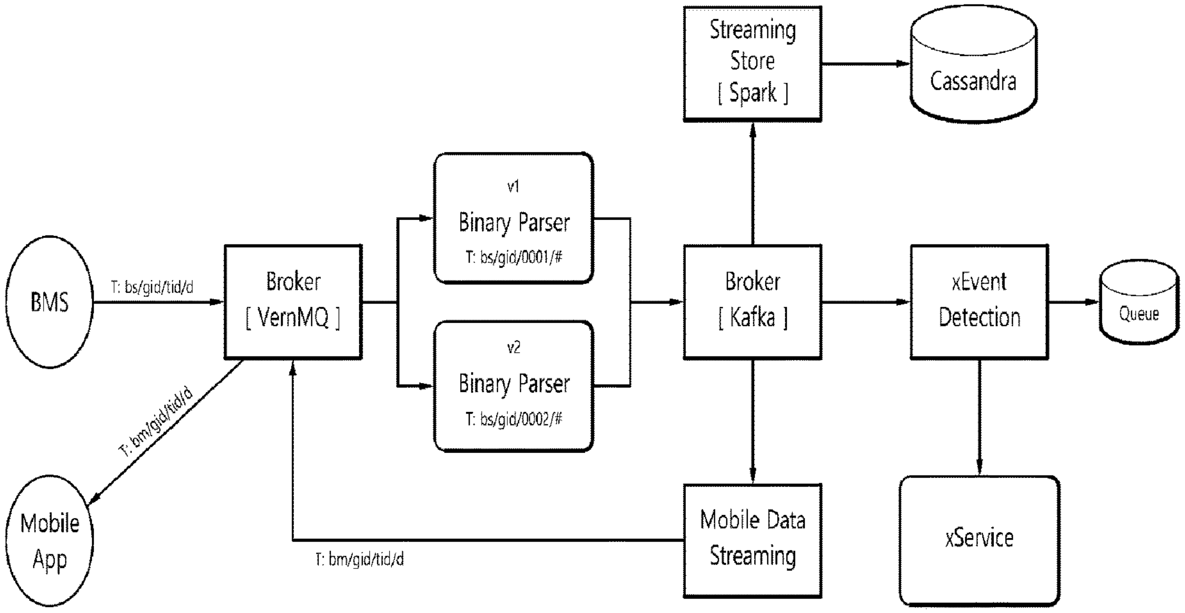
FIG. 6 is a schematic diagram showing an example of a battery management system structure according to an embodiment of the present invention.

FIG. 5 is a block diagram showing the process of outputting the resulting information from the output unit of FIG. 2.

Referring to FIG. 5, if based on the determination conditions and service command of a pre-registered battery management service, it is determined that there exists battery information matching the determination condition, the control unit 230 may control for the resulting information to be created from the battery information extracted in accordance with the service command.

Accordingly, the output unit 240 may output the resulting information. At this time, the output unit 240 may be configured for the resulting information to be outputted in the form of preset shape, number, letter, picture, etc. through a display device, etc.

Meanwhile, the output unit 240 may be configured to transmit the resulting information to the battery management device 100 or the terminal device 300 in accordance with the control of the control unit 230. In this case, the output unit 240 may transmit the resulting information to the battery management device 100 or the terminal device 300 through a wireless network, etc.

Through this, the battery management device 100 may update or control the state of the battery 101 based on the resulting information.

Figure 7:
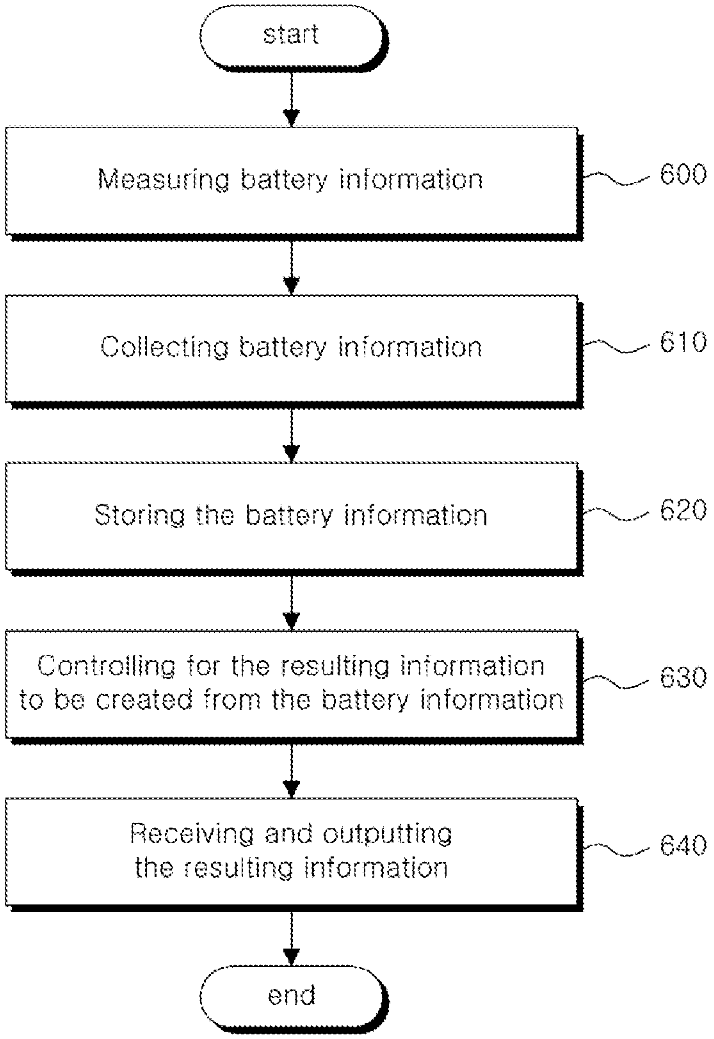
FIG. 7 is a flowchart of a battery management method according to an embodiment of the present invention.

FIG. 7 is a flowchart of a battery management method according to an embodiment of the present invention.

The battery management method according to an embodiment of the present invention is carried out in substantially the same configuration as the battery management system 1 shown in FIG. 1 and therefore, the same components as the battery management system 1 shown in FIG. 1 are denoted by the same reference numerals and repeated explanations will be omitted.

The battery management method may comprise the steps of measuring battery information 600, collecting the battery information 610, storing the battery information 620, controlling for the resulting information to be created from the battery information 630, and receiving and outputting the resulting information 640.

The step 600 of measuring battery information may be a step in which the battery management device 100 measures battery information from the battery 101.

The step 610 of collecting the battery information may be a step in which the cloud server device 200 collects the battery information from the pre-prepared battery management device 100.

The step 620 of storing the battery information may be a step of storing the battery information in the cloud server device 200.

The step 630 of controlling for the resulting information to be created from battery information may be a step in which if, based on the determination condition and service command of a pre-registered battery management service, it is determined that there exists battery information matching the determination condition, the cloud server device 200 controls for the resulting information to be created from the battery information extracted in accordance with the service command.

The step 640 of receiving and outputting the resulting information may be a step in which the terminal device 300 receives and outputs the resulting information.

Although the above has been described with reference to embodiments, those skilled in the art will understand that various modifications and changes may be made to the present invention without departing from the spirit and scope of the present invention as set forth in the following claims.

The invention claimed is:

1. A battery management system comprising:

a cloud server device collecting first battery information, measured by a battery management device, disposed on a mobile vehicle;

the cloud server device storing the first battery information and controlling for a resulting information to be created from second battery information matching a determination condition in accordance with a service command of a pre-registered battery management service if the cloud server device determines that there exists the second battery information matching the determination condition; and the cloud server device transmitting the resulting information to a terminal device that outputs the resulting information, wherein, if the pre-registered battery management service is provided to estimate a charging state as the resulting information, the cloud server device determines whether battery information of at least one of System Accumulated Current (SAC), Ceiling Accumulated Current (CAC), and Floor Accumulated Current (FAC) exists in the cloud server device within a preset time interval based on a current time, wherein the SAC is calculated by accumulating a current of a battery collected from a preset reference time, wherein the CAC is a first accumulated amount of the current at a first point where the battery enters a fully charged state, and wherein the FAC is a second accumulated amount of the current at a second point where the battery enters a fully discharged state.

2. A cloud server device comprising:

a collection unit collecting first battery information from a battery management device disposed on a mobile vehicle;

a storage unit storing the first battery information;

a control unit controlling for a resulting information to be created from second battery information matching a determination condition in accordance with a service command of a pre-registered battery management service if the control unit determines that there exists the second battery information matching the determination condition; and an output unit outputting the resulting information, wherein the control unit comprises a detector module determining whether the second battery information matching the determination condition exists among the first battery information stored in the storage unit, wherein, if the pre-registered battery management service is provided to estimate a charging state as the resulting information, the detector module determines whether battery information of at least one of System Accumulated Current (SAC), Ceiling Accumulated Current (CAC), and Floor Accumulated Current (FAC) exists in the storage unit within a preset time interval based on a current time, wherein the SAC is calculated, by the control unit, by accumulating a current of a battery collected from a preset reference time, wherein the CAC is a first accumulated amount of the current at a first point where the battery enters a fully charged state, and wherein the FAC is a second accumulated amount of the current at a second point where the battery enters a fully discharged state.

3. The cloud server device according to claim 2, wherein the control unit further comprises:

a framework module extracting the determination condition and the service command from the pre-registered battery management service;

and a service module executing the service command and creating the resulting information from the second battery information matching the determination condition when the service module receives the second battery information matching the determination condition.

4. The cloud server device according to claim 3, wherein if the detector module determines that the second battery information matches the determination condition, the detector module requests the framework module to extract the second battery information matching the determination condition.

5. The cloud server device according to claim 3, wherein if the detector module determines that there exists the second battery information matching the determination condition, the framework module controls for the service command to be executed by extracting the second battery information matching the determination condition and transmitting the second battery information to the service module.

6. The cloud server device according to claim 3, wherein if the resulting information is created in the service module, the framework module controls for the resulting information to be transmitted to the battery management device.

7. The cloud server device according to claim 3, wherein the storage unit stores at least one of a Capacity Retention (CR) of the battery, the SAC, the CAC, the FAC, a System Accumulated Absolute Current (SAAC), a Ceiling Accumulated Absolute Current (CAAC), and a Floor Accumulated Absolute Current (FAAC).

8. The cloud server device according to claim 7, wherein the SAAC is calculated by accumulating absolute current values of the battery collected from the preset reference time, the CAAC represents a first accumulated amount of absolute current value at the first point where the battery enters the fully charged state, and the FAAC represents a second accumulated amount of absolute current value at the second point where the battery enters the fully discharged state.

9. The cloud server device according to claim 8, wherein, when the service module receives the SAAC, the CAAC, the FAAC, the FAC, the CAC, the SAC and CR from the framework module, the service module estimates the charging state of the battery by comparing a first difference between the SAAC and the CAAC and a second difference between the SAAC and the FAAC.

10. The cloud server device according to claim 9, wherein, if the first difference between the SAAC and the CAAC is greater than the second difference between the SAAC and the FAAC, the service module estimates the charging state of the battery based on a ratio of a difference between the SAC and the FAC to the CR.

11. The cloud server device according to claim 9, wherein, if the first difference between the SAAC and the CAAC is less than the second difference between the SAAC and the FAAC, the service module estimates the charging state of the battery based on a ratio of a difference between the CAC and the SAC to the CR.

12. The cloud server device according to claim 2, wherein:

the pre-registered battery management service is an algorithm configured to estimate a state of a battery;

the determination condition is required battery information for the algorithm to be executed; and the service command is a machine language, command code, or learning model using artificial intelligence techniques configured to create the resulting information from the second battery information based on the algorithm.

13. A method of managing a battery in a battery management system comprising:

measuring, by a battery management device disposed on a mobile vehicle, first battery information;

collecting, by a cloud server device, the first battery information from the battery management device;

storing the first battery information in the cloud server device;

controlling, by the cloud server device, for a resulting information to be created from second battery information matching a determination condition in accordance with a service command of a pre-registered battery management service if the cloud server device determines there exists the second battery information matching the determination condition; and receiving and outputting, by a terminal device, the resulting information, wherein the cloud server device comprises a detector module determining whether the second battery information matching the determination condition exists among the first battery information stored the cloud server device; and wherein, if the pre-registered battery management service is provided to estimate a charging state as the resulting information, the detector module determines whether battery information of at least one of System Accumulated Current (SAC), Ceiling Accumulated Current (CAC), and Floor Accumulated Current (FAC) exists in the cloud server device within a preset time interval based on a current time, wherein the SAC is calculated by accumulating a current of a battery collected from a preset reference time, wherein the CAC is a first accumulated amount of the current at a first point where the battery enters a fully charged state, and wherein the FAC is a second accumulated amount of the current at a second point where the battery enters a fully discharged state.

14. The method according to claim 13, wherein the cloud server device further comprises:

a framework module extracting the determination condition and the service command from the pre-registered battery management service;

and a service module executing the service command and creating the resulting information from the second battery information matching the determination condition when the service module receives the second battery information matching the determination condition.

15. The method according to claim 14, wherein if the detector module determines that the second battery information matches the determination condition, the detector module requests the framework module to extract the second battery information matching the determination condition.

16. The method according to claim 14, wherein if the detector module determines that there exists the second battery information matching the determination condition, the framework module controls for the service command to be executed by extracting the second battery information matching the determination condition and transmitting the second battery information matching the determination condition to the service module.

17. The method according to claim 14, wherein if the resulting information is created in the service module, the framework module controls for the resulting information to be transmitted to the battery management device.

* * * * *